US012677108B2

(12) United States Patent
Enomoto et al.

(10) Patent No.: US 12,677,108 B2
(45) Date of Patent: Jul. 7, 2026

(54) ACOUSTIC REPRODUCTION METHOD, RECORDING MEDIUM, AND ACOUSTIC REPRODUCTION DEVICE

(71) Applicant: Panasonic Intellectual Property Corporation of America, Torrance, CA (US)

(72) Inventors: Seigo Enomoto, Kyoto (JP); Ko Mizuno, Osaka (JP); Tomokazu Ishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 316 days.

(21) Appl. No.: 18/374,221

(22) Filed: Sep. 28, 2023

(65) Prior Publication Data

US 2024/0031763 A1 Jan. 25, 2024

Related U.S. Application Data

(63) Continuation of application No. PCT/JP2022/015600, filed on Mar. 29, 2022.

(Continued)

(30) Foreign Application Priority Data

Mar. 16, 2022 (JP) ................................ 2022-041201

(51) Int. Cl.
*H04S 7/00* (2006.01)

(52) U.S. Cl.
CPC .......... *H04S 7/304* (2013.01); *H04S 2400/15* (2013.01); *H04S 2420/01* (2013.01)

(58) Field of Classification Search
None
See application file for complete search history.

(56) References Cited

U.S. PATENT DOCUMENTS

2006/0198527 A1* 9/2006 Chun ...................... H04S 3/008 381/17
2008/0273708 A1* 11/2008 Sandgren ................ H04S 1/005 381/63

(Continued)

FOREIGN PATENT DOCUMENTS

WO 2017/220852 12/2017

OTHER PUBLICATIONS

International Search Report (ISR) issued on Jun. 28, 2022 in International (PCT) Application No. PCT/JP2022/015600.

*Primary Examiner* — Qin Zhu
(74) *Attorney, Agent, or Firm* — Wenderoth, Lind & Ponack, L.L.P.

(57) ABSTRACT

An acoustic reproduction method includes: obtaining information indicating sounds that reach a listener in a sound reproduction space and direction information indicating a direction in which the head of the listener is oriented; judging whether a first direction in which a first sound reaches the listener and a second direction in which a second sound reaches the listener are in plane symmetry with respect to a predetermined plane that passes through both ears of the listener and is perpendicular to the direction in which the head of the listener is oriented, the first and the second sounds being included in the sounds indicated in the information obtained; performing processing on sound information indicating the second sound when the first and the second directions are judged to be in plane symmetry, the processing being change processing of changing the second direction; and outputting the sound information subjected to the change processing.

7 Claims, 11 Drawing Sheets

Related U.S. Application Data

(60) Provisional application No. 63/173,645, filed on Apr. 12, 2021.

(56) References Cited

U.S. PATENT DOCUMENTS

| | | | | |
|---|---|---|---|---|
| 2015/0264185 | A1* | 9/2015 | Gleim | G10L 21/02<br>379/202.01 |
| 2018/0192226 | A1* | 7/2018 | Woelfl | H04R 5/033 |
| 2019/0166448 | A1 | 5/2019 | Laaksonen et al. | |
| 2021/0211823 | A1* | 7/2021 | Shani | G06F 3/165 |
| 2022/0214858 | A1* | 7/2022 | Karri | G06F 18/24 |

* cited by examiner

ACOUSTIC REPRODUCTION METHOD, RECORDING MEDIUM, AND ACOUSTIC REPRODUCTION DEVICE

CROSS REFERENCE TO RELATED APPLICATIONS

This is a continuation application of PCT International Application No. PCT/JP2022/015600 filed on Mar. 29, 2022, designating the United States of America, which is based on and claims priority of U.S. Provisional Patent Application No. 63/173,645 filed on Apr. 12, 2021 and Japanese Patent Application No. 2022-041201 filed on Mar. 16, 2022. The entire disclosures of the above-identified applications, including the specifications, drawings and claims are incorporated herein by reference in their entirety.

FIELD

The present disclosure relates to an acoustic reproduction method, for example.

BACKGROUND

Patent Literature (PTL) 1 discloses an acoustic reproduction method in which processing (rendering) based on a first rule and a second rule is performed on one or more first sounds (acoustic objects) and another one or more second sounds (acoustic objects), respectively.

CITATION LIST

Patent Literature

PTL 1: WO 2017/220852

SUMMARY

Technical Problem

It may be difficult for a listener to accurately perceive two sounds that reach the listener.

Thus, an object of the present disclosure is to provide an acoustic reproduction method and the like that makes it easier for a listener to accurately perceive two sounds reaching the listener.

Solution to Problem

An acoustic reproduction method according to an aspect of the present disclosure includes: obtaining information indicating a plurality of sounds and direction information indicating a direction in which a head of a listener is oriented, the plurality of sounds reaching the listener in a sound reproduction space; judging whether a first direction in which a first sound reaches the listener and a second direction in which a second sound reaches the listener are in plane symmetry with respect to a predetermined plane, the first sound and the second sound being included in the plurality of sounds indicated in the information obtained, the predetermined plane passing through both ears of the listener and being perpendicular to the direction in which the head of the listener is oriented; performing processing on sound information indicating the second sound when the first direction and the second direction are judged to be in plane symmetry, the processing being change processing of changing the second direction; and outputting the sound information subjected to the change processing.

A recording medium according to an aspect of the present disclosure is a non-transitory computer-readable recording medium having recorded thereon a program for causing a computer to execute the acoustic reproduction method described above.

An acoustic reproduction device according to an aspect of the present disclosure includes: an obtainer that obtains information indicating a plurality of sounds and direction information indicating a direction in which a head of a listener is oriented, the plurality of sounds reaching the listener in a sound reproduction space; a judging unit that judges whether a first direction in which a first sound reaches the listener and a second direction in which a second sound reaches the listener are in plane symmetry with respect to a predetermined plane, the first sound and the second sound being included in the plurality of sounds indicated in the information obtained, the predetermined plane passing through both ears of the listener and being perpendicular to the direction in which the head of the listener is oriented; a processor that performs processing on sound information indicating the second sound when the first direction and the second direction are judged to be in plane symmetry, the processing being change processing of changing the second direction; and an outputter that outputs the sound information subjected to the change processing.

Note that these general or specific aspects may be implemented using a system, a device, a method, an integrated circuit, a computer program, or a non-transitory computer-readable recording medium such as a compact disc-read only memory (CD-ROM), or any combination of systems, devices, methods, integrated circuits, computer programs, or recording media.

Advantageous Effects

An acoustic reproduction method according to an aspect of the present disclosure makes it easier for a listener to accurately perceive two sounds reaching the listener.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
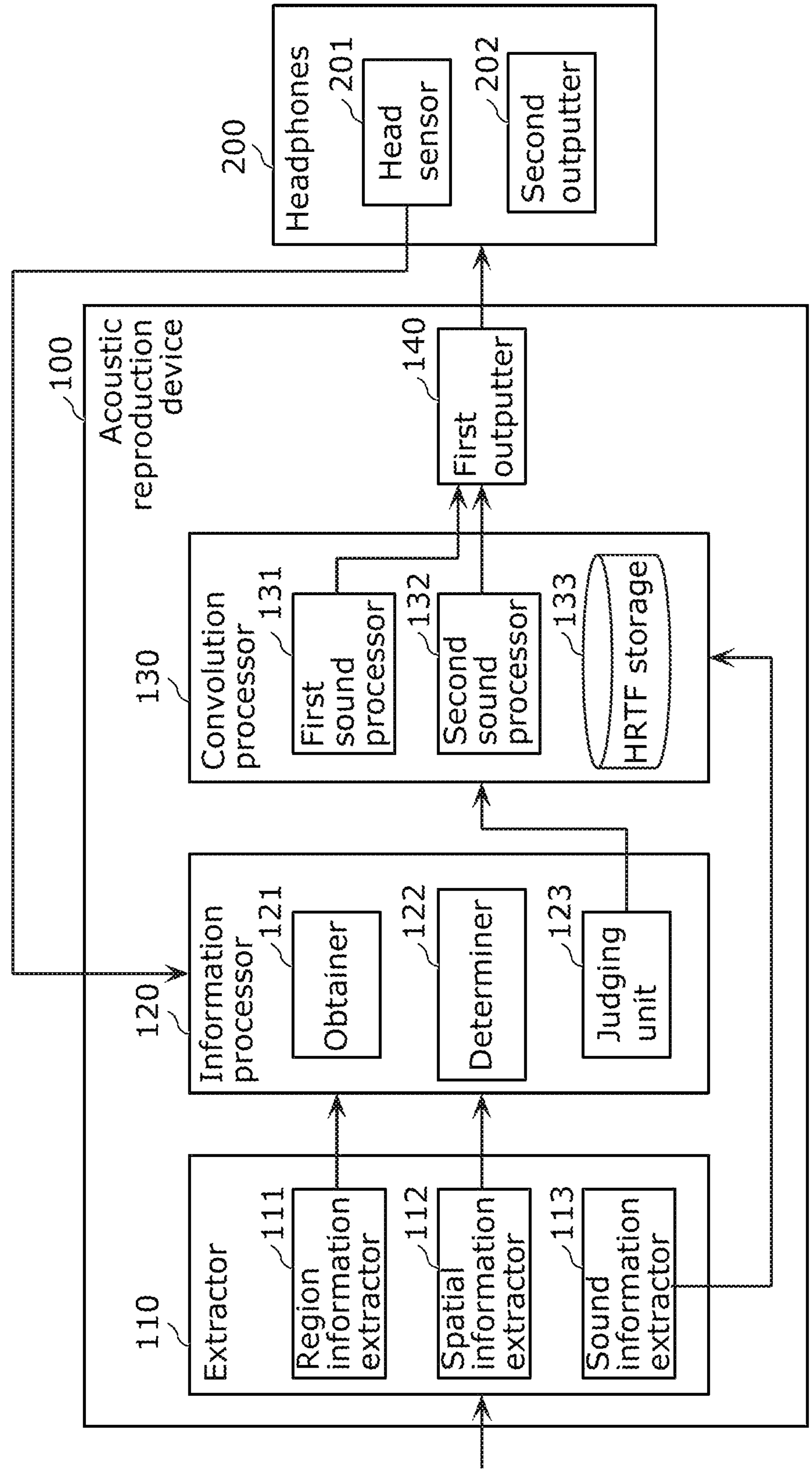
FIG. 1 is a block diagram illustrating a functional configuration of an acoustic reproduction device according to Embodiment 1.

Underlying Knowledge Forming Basis of the Present Disclosure

There has been known an acoustic reproduction method of performing, on a plurality of sounds, processing based on a rule that is different for each sound, thus enabling a listener to listen, that is, perceive the plurality of sounds.

For example, PTL 1 discloses the following acoustic reproduction method. In the acoustic reproduction method, a plurality of sounds are classified so as to belong to a first group or a second group in accordance with an action of a listener. Further, processing based on a first rule is performed on one or more first sounds belonging to the first group, and processing based on a second rule is performed on one or more second sounds belonging to the second group.

For example, the first rule defines changing an intensity of a first sound and changing a distance between the first sound and a listener, and the second rule defines changing an intensity of a second sound and changing a distance between the second sound and the listener.

Such an acoustic reproduction method enables a listener to perceive two sounds (a first sound and a second sound).

However, with the acoustic reproduction method disclosed in PTL 1, it may be difficult for a listener to accurately perceive two sounds that reach the listener. This will be described below.

A plane that passes through a listener and is perpendicular to a direction in which a head of the listener is oriented is defined as a predetermined plane. When the predetermined plane is set as a symmetry plane, in the case where a first direction in which a first sound reaches the listener and a second direction in which a second sound reaches the listener are in plane symmetry, it is difficult for the listener to accurately perceive the two sounds that reach the listener. Note that the case where the first direction and the second direction are in plane symmetry is, in other words, the case where an angle formed between the predetermined plane and a direction in which the first sound reaches the listener (the first direction) is equal to an angle formed between the predetermined plane and a direction in which the second sound reaches the listener (the second direction).

In such a case, such a problem that the listener hears the first sound and the second sound as if the first sound and the second sound come from the same direction occurs. That is to say, the listener fails to accurately perceive the first sound and the second sound. The problem occurs because a human has sensory characteristics (specifically, aural characteristics) derived from an auricular shape and a difference limen.

In such a case, the listener hears the first sound and the second sound as if the first sound and the second sound come from the same direction even when the processing is performed in such a manner that the intensities and the like of the first sound and the second sound are changed as shown by the acoustic reproduction method disclosed in PTL 1. Therefore, there is a demand for an acoustic reproduction method and the like that makes it easier for a listener to accurately perceive two sounds reaching the listener.

In view of the above, an acoustic reproduction method according to an aspect of the present disclosure includes: obtaining first region information indicating a first region in which a sound image of a first sound is localized and direction information indicating a direction in which a head of a listener is oriented, the first sound being an object sound that reaches the listener in a sound reproduction space; in a case where a plane passing through both ears of the listener and being perpendicular to the direction in which the head of the listener is oriented is defined as a predetermined plane, judging plane symmetry, the judging of the plane symmetry including: obtaining second region information indicating a second region in which a sound image of a second sound that reaches the listener in the sound reproduction space is localized; and judging, based on the direction information obtained, whether a first direction in which the first sound reaches the listener and a second direction in which the second sound reaches the listener are in plane symmetry with respect to the predetermined plane as a symmetry plane; performing processing when the first direction and the second direction are judged to be in plane symmetry, the performing of the processing including: obtaining sound information indicating the second sound; and performing, on the sound information obtained, change processing of changing the second direction in order for the first direction and the second direction not to be in plane symmetry; and outputting the sound information subjected to the change processing.

Accordingly, the first direction and the second direction are not in a plane-symmetric relation. Further, the angle formed between the direction (the first direction) in which the first sound reaches the listener and the predetermined plane is different from the angle formed between the direction (the second direction) in which the second sound reaches the listener and the predetermined plane. Thus, such a problem as described above that the listener hears the first sound and the second sound as if the first sound and the second sound come from the same direction is inhibited from occurring. Therefore, the listener can accurately perceive the first sound and the second sound. That is to say, an acoustic reproduction method that makes it easier for the listener to accurately perceive two sounds reaching the listener is implemented.

Further, for example, the second sound may be an object sound different from the first sound, the acoustic reproduction method may include: extracting information, the extracting of the information including: obtaining audio content information; and extracting the first region information, the second region information, and the sound information that are included in the audio content information obtained, in the obtaining of the first region information and the direction information, the first region information extracted may be obtained, in the judging of the plane symmetry, the second region information extracted may be obtained, and in the performing of the processing, the sound information extracted may be obtained.

Accordingly, even in the case where the second sound is an object sound different from the first sound, an acoustic reproduction method which makes it easier for the listener to accurately perceive two sounds reaching the listener is implemented.

Further, for example, the obtaining of the first region information and the direction information may include obtaining spatial information indicating a shape of the sound reproduction space, the acoustic reproduction method may include: determining, based on the first region information obtained and the spatial information obtained, the second region in which the sound image of the second sound is localized, the second sound being a reflected sound of the first sound, in the judging of the plane symmetry, the second region information indicating the second region determined may be obtained, and in the performing of the processing, sound information indicating the first sound may be obtained as the sound information indicating the second sound.

Accordingly, even in the case where the second sound is a reflected sound of the first sound, an acoustic reproduction method which makes it easier for the listener to accurately perceive two sounds reaching the listener is implemented.

Further, for example, in the performing of the processing, the change processing of shifting the second direction to increase at least one of an interaural level difference of the second sound or an interaural time difference of the second sound may be performed.

Accordingly, by shifting the direction (the second direction) in which the second sound reaches the listener, the angle formed between the direction (the first direction) in which the first sound reaches the listener and the predetermined plane is different from the angle formed between the direction (the second direction) in which the second sound reaches the listener and the predetermined plane. Further, as the interaural level difference of the second sound increases, it becomes easier for the listener to perceive the direction (the second direction) in which the second sound reaches the listener. Likewise, as the interaural time difference of the second sound increases, it becomes easier for the listener to perceive the direction (the second direction) in which the second sound reaches the listener. Accordingly, an acoustic reproduction method which, by shifting the direction (the second direction) in which the second sound reaches the listener to increase at least one of the interaural level difference or the interaural time difference, makes it easier for the listener to more accurately perceive the two sounds reaching the listener is implemented.

Further, a recording medium according to an aspect of the present disclosure is a non-transitory computer-readable recording medium having recorded thereon a program for causing a computer to execute the acoustic reproduction method described above.

Accordingly, the computer can execute the above-described acoustic reproduction method according to the program.

Further, an acoustic reproduction device according to an aspect of the present disclosure includes: an obtainer that obtains first region information indicating a first region in which a sound image of a first sound is localized and direction information indicating a direction in which a head of a listener is oriented, the first sound being an object sound that reaches the listener in a sound reproduction space; in a case where a plane passing through both ears of the listener and being perpendicular to the direction in which the head of the listener is oriented is defined as a predetermined plane, a judging unit that obtains second region information indicating a second region in which a sound image of a second sound that reaches the listener in the sound reproduction space is localized, and judges, based on the direction information obtained, whether a first direction in which the first sound reaches the listener and a second direction in which the second sound reaches the listener are in plane symmetry with respect to the predetermined plane as a symmetry plane; a processor that, when the first direction and the second direction are judged to be in plane symmetry, obtains sound information indicating the second sound, and performs, on the sound information obtained, change processing of changing the second direction in order for the first direction and the second direction not to be in plane symmetry; and an outputter that outputs the sound information subjected to the change processing.

Accordingly, the first direction and the second direction are not in a plane-symmetric relation. Further, the angle formed between the direction (the first direction) in which the first sound reaches the listener and the predetermined plane is different from the angle formed between the direction (the second direction) in which the second sound reaches the listener and the predetermined plane. Thus, such a problem as described above that the listener hears the first sound and the second sound as if the first sound and the second sound come from the same direction is inhibited from occurring. Therefore, the listener can accurately perceive the first sound and the second sound. That is to say, an acoustic reproduction device that makes it easier for the listener to accurately perceive two sounds reaching the listener is implemented.

In addition, these general or specific aspects may be implemented using a system, a device, a method, an integrated circuit, a computer program, or a non-transitory computer-readable recording medium such as a CD-ROM, or any combination of systems, devices, methods, integrated circuits, computer programs, or recording media.

Hereinafter, embodiments will be specifically described with reference to the drawings.

Note that the following embodiments each illustrate a general or specific example. The numerical values, shapes, materials, constituent elements, the arrangement and connection of the constituent elements, steps, the processing order of the steps etc. illustrated in the following embodiments are mere examples, and are not intended to limit the scope of the claims.

Further, in the following description, ordinal numbers, such as “first” and “second”, are assigned to some elements. These ordinal numbers are assigned to some elements to distinguish the elements, and do not necessarily correspond to meaningful orders. These ordinal numbers may be interchanged, newly assigned, or removed where appropriate.

Furthermore, the drawings are represented schematically and are not necessarily precise illustrations. Therefore, the scales, for example, are not necessarily consistent from drawing to drawing. Constituent elements that are substantially the same are given the same reference signs in the drawings, and redundant descriptions will be omitted or simplified.

In the present specification, terms indicating a relationship between elements, such as “parallel” and “perpendicular”, and numerical value ranges do not express the strict meanings only, but also include substantially equivalent ranges, e.g., differences of several percent, as well.

Embodiment 1

[Configuration]

Figure 2:
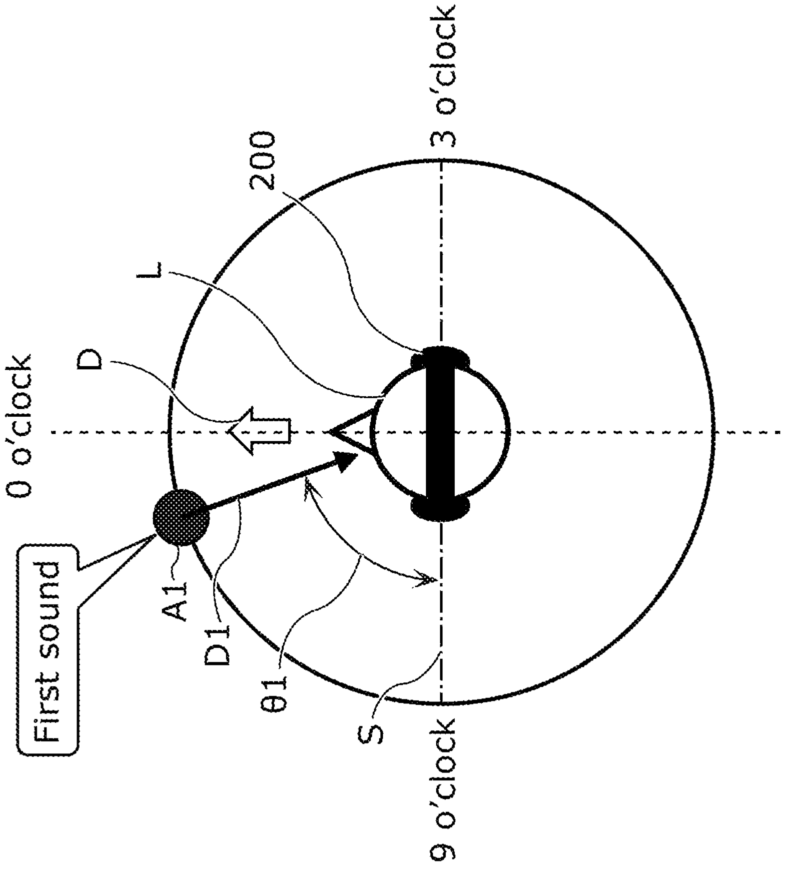
FIG. 2 is a schematic diagram illustrating a sound reproduction space according to Embodiment 1.

First, a configuration of acoustic reproduction device 100 according to Embodiment 1 will be described. FIG. 1 is a block diagram illustrating a functional configuration of acoustic reproduction device 100 according to the present embodiment. FIG. 2 is a schematic diagram illustrating a sound reproduction space according to the present embodiment.

Acoustic reproduction device 100 according to the present embodiment is a device that performs processing on sound information indicating a first sound and sound information indicating a second sound and outputs the sound information to headphones 200 worn by listener L to cause listener L to listen to the first sound and the second sound. Specifically, acoustic reproduction device 100 is a stereophonic reproduction device that causes listener L to listen to a stereophonic sound. As an example, acoustic reproduction device 100 according to the present embodiment is a device to be applied to various applications such as virtual reality or augmented reality (VR/AR) or the like.

FIG. 2 illustrates a first sound, which is an object sound that reaches listener L in the sound reproduction space. Specifically, FIG. 2 is a diagram of the sound reproduction space as viewed in a direction toward listener L from above listener L, that is, a vertically downward direction toward listener L from above a head of listener L. Note that, in the present embodiment, the sound reproduction space means a virtual reality space or an augmented reality space that is used in various applications for virtual reality or augmented reality (VR/AR), or the like.

In the sound reproduction space illustrated in FIG. 2, 0 o'clock, 3 o'clock, and 9 o'clock are illustrated to indicate directions correspondingly to hours on a clock dial. The solid-white arrow indicates direction D in which the head of listener L is oriented. In FIG. 2, direction D in which the head of listener L positioned at the center of the clock dial (also referred to as an origin) is oriented is the direction of 0 o'clock. Hereinafter, a direction in which listener L and 0 o'clock are connected may be denoted as the "direction of 0 o'clock". This applies to other hours indicated on the clock dial.

Here, the first sound according to the present embodiment will be described.

As illustrated in FIG. 2, a sound image of the first sound which is an object sound is localized in first region A1. That is to say, the first sound is a sound that reaches listener L from first region A1 in the sound reproduction space. In addition, when viewed in a vertically downward direction toward listener L from above the head of listener L as illustrated in FIG. 2, the first sound is a sound that reaches listener L from first region A1. In FIG. 2, first region A1 is illustrated with a black dot. A direction in which the first sound reaches listener L is first direction D1.

A plane that passes through both ears of listener L and is perpendicular to direction D in which the head of listener L is oriented is defined as predetermined plane S. Predetermined plane S according to the present embodiment is a plane passing through both ears of listener L and is a plane perpendicular to direction D (specifically, a plane parallel to a vertical direction). Predetermined plane S can be considered to be a coronal plane of listener L. In FIG. 2, since direction D in which the head of listener L is oriented is the direction of 0 o'clock, predetermined plane S is illustrated with a chain line extending in the directions of 3 o'clock and 9 o'clock.

Note that the second sound, which is not illustrated in FIG. 2, will be described later.

Next, headphones 200 will be described.

As illustrated in FIG. 1, headphones 200 are a sound output device that includes head sensor 201 and second outputter 202.

Head sensor 201 senses direction D in which the head of listener L is oriented, and head sensor 201 outputs direction information that indicates direction D in which the head of listener L is oriented to acoustic reproduction device 100. Note that direction D in which the head of listener L is oriented is also a direction in which a face of listener L is oriented.

Head sensor 201 may sense information on 6 degrees of freedom (DoF) of the head of listener L. For example, head sensor 201 may be an inertial measurement unit (IMU), an accelerometer, a gyroscope, or a magnetic sensor, or a combination thereof.

When direction D in which the head of listener L is oriented is defined as a forward direction of listener L and an opposite direction to the forward direction is defined as a rearward direction of listener L, the first sound is a sound that reaches listener L from the forward direction of listener L in the present embodiment, as illustrated in FIG. 2.

Second outputter 202 is a device that reproduces the first sound and the second sound. More specifically, second outputter 202 reproduces the first sound and the second sound based on the sound information indicating the first sound and the sound information indicating the second sound that are processed by acoustic reproduction device 100 and output by acoustic reproduction device 100. Note that the sound information indicating the first sound may be hereinafter denoted as first sound information, and that the sound information indicating the second sound may be hereinafter denoted as second sound information.

Now, acoustic reproduction device 100 illustrated in FIG. 1 will be described.

As illustrated in FIG. 1, acoustic reproduction device 100 includes extractor 110, information processor 120, convolution processor 130, and first outputter 140.

Extractor 110 obtains audio content information and extracts predetermined information that is included in the audio content information obtained. Extractor 110 obtains the audio content information from, for example, a storage device (not illustrated) outside acoustic reproduction device 100. Extractor 110 may obtain the audio content information that is stored in a storage device (not illustrated) included in acoustic reproduction device 100 itself. Extractor 110 includes region information extractor 111, spatial information extractor 112, and sound information extractor 113.

Region information extractor 111*a* extracts first region information that is included in the audio content information obtained. The first region information is information that indicates first region A1 in which the sound image of the first sound is localized. More specifically, the first region information is information that indicates a position of first region A1 in the sound reproduction space.

Spatial information extractor 112 extracts spatial information that is included in the audio content information obtained. The spatial information is information that indicates a shape of the sound reproduction space. More specifically, the spatial information is information that indicates installation positions and shapes of pieces of installed equipment (walls, a door, a floor, a ceiling, fixtures, etc.) in the audio reproduction space. The spatial information also includes information that indicates to what degree the pieces of installed equipment reflect sounds of what frequencies.

Sound information extractor 113 extracts first sound information that is included in the audio content information obtained. The first sound information is information that indicates the first sound that is an object sound. The first sound information is digital data that is given in the form of WAVE, MP3, WMA, or the like.

As seen from the above, the audio content information includes the first region information, the first sound information, and the spatial information in the present embodiment.

The audio content information may be subjected to encoding processing such as MPEG-H 3D Audio (ISO/IEC 23008-3) (hereinafter, will be denoted as MPEG-H 3D Audio). That is to say, extractor 110 obtains the audio content information that is an encoded bitstream. Extractor 110 obtains and decodes the audio content information. Extractor 110 performs decoding processing based on MPEG-H 3D Audio described above or the like. That is to say, extractor 110 functions as, for example, a decoder.

Information processor 120 judges, based on the first region information, the spatial information, and the direction information, a position relationship between first region A1 in which the sound image of the first sound is localized and a second region in which a sound image of the second sound is localized. Information processor 120 includes obtainer 121, determiner 122, and judging unit 123.

Obtainer 121 obtains the first region information and the spatial information that are extracted by extractor 110. More specifically, obtainer 121 obtains the first region information extracted by region information extractor 111 and the spatial information extracted by spatial information extractor 112. In addition, obtainer 121 obtains the direction information sensed by headphones 200 (more specifically, head sensor 201).

Determiner 122 determines, based on the first region information and spatial information obtained, the second region in which the sound image of the second sound is localized.

Here, the second sound will be described. For example, in the case where there is a piece of installed equipment and the like in the sound reproduction space, the first sound directly reaches listener L and reaches listener L after being reflected by the piece of installed equipment. In the present embodiment, the second sound is the first sound that reaches listener L after being reflected by the piece of installed equipment. That is to say, the second sound is a reflected sound of the first sound. A direction in which the second sound reaches listener L is a second direction.

Based on first region A1 indicated by the first region information and an installation position and a shape of a piece of installed equipment indicated by the spatial information, determiner 122 determines whether a reflected sound of the first sound (the second sound) is present, and when the second sound is present, determiner 122 determines the second region in which the sound image of the second sound is localized. Further, determiner 122 outputs second region information that indicates the second region determined to judging unit 123. The second region information is information that indicates a position of the second region in the sound reproduction space.

Judging unit 123 obtains the second region information indicating the second region in which the sound image of the second sound reaching listener L is localized in the sound reproduction space. In the present embodiment, judging unit 123 obtains the second region information indicating the second region determined by determiner 122. Further, judging unit 123 judges, based on the direction information obtained by obtainer 121, whether first direction D1 in which the first sound reaches listener L and the second direction in which the second sound reaches listener L are in plane symmetry with respect to predetermined plane S as a symmetry plane. Further, judging unit 123 outputs a result of the judgment to convolution processor 130.

Convolution processor 130 performs, based on the result of the judgment made by judging unit 123, processing on the sound information indicating the first sound (the first sound information) and the sound information indicating the second sound (the second sound information). Convolution processor 130 includes first sound processor 131, second sound processor 132, and head-related transfer function (HRTF) storage 133.

First sound processor 131 performs processing on the first sound information with reference to a head-related transfer function that is stored in HRTF storage 133. More specifically, first sound processor 131 performs processing of convolving the first sound information with the head-related transfer function in order for the first sound to reach listener L from first region A1 indicated by the first region information obtained by obtainer 121. First sound processor 131 obtains the first sound information extracted from the audio content information by sound information extractor 113 of extractor 110 and performs the processing on the first sound information obtained.

Second sound processor 132 is an example of a processor that performs processing on the second sound information with reference to a head-related transfer function that is stored in HRTF storage 133. More specifically, second sound processor 132 performs processing of convolving the second sound information with the head-related transfer function in order for the second sound to reach listener L from the second region determined by determiner 122. As described above, the second sound is a reflected sound of the first sound. Second sound processor 132 thus obtains, as the second sound information, the first sound information extracted from the audio content information by sound information extractor 113 of extractor 110 and performs the processing on the second sound information obtained.

In the case where judging unit 123 judges that first direction D1 and the second direction are in plane symmetry, second sound processor 132 performs the following processing. Second sound processor 132 obtains the sound information indicating the second sound (the second sound information) and performs, on the second sound information obtained, processing (change processing) of changing the second direction in which the second sound reaches listener L in order for first direction D1 and the second direction not to be in plane symmetry. That is to say, in this case, second sound processor 132 performs processing of convolving the second sound information with the head-related transfer function in order to change the second region and to change the second direction in which the second sound reaches listener L.

HRTF storage 133 is a storage device in which the head-related transfer functions used by first sound processor 131 and second sound processor 132 are stored.

The first sound information subjected to the processing by first sound processor 131 is output to first outputter 140. Likewise, the second sound information subjected to the processing by second sound processor 132 is output to first outputter 140.

First outputter 140 is an example of an outputter. First outputter 140 obtains the first sound information and second sound information output and outputs the first sound information and second sound information obtained to headphones 200. In the present embodiment, first outputter 140 mixes the first sound information obtained and second sound information obtained together and outputs the first sound information and second sound information mixed together to headphones 200.

Note that, in the case where judging unit 123 judges that first direction D1 and the second direction are not in plane symmetry, first outputter 140 obtains the first sound information subjected to the processing and the second sound information subjected to the processing. In the case where judging unit 123 judges that first direction D1 and the second direction are in plane symmetry, first outputter 140 obtains the first sound information subjected to the processing and the second sound information subjected to the change processing.

Further, second outputter 202 of headphones 200 reproduces the first sound and the second sound based on the first sound information and second sound information output by first outputter 140.

In this manner, information processor 120, convolution processor 130, and first outputter 140 output, based on the information extracted by extractor 110, the first sound information and the second sound information that are reproducible by headphones 200. That is to say, for example, information processor 120, convolution processor 130, and first outputter 140 function as a renderer.

Operation Example

Figure 3:
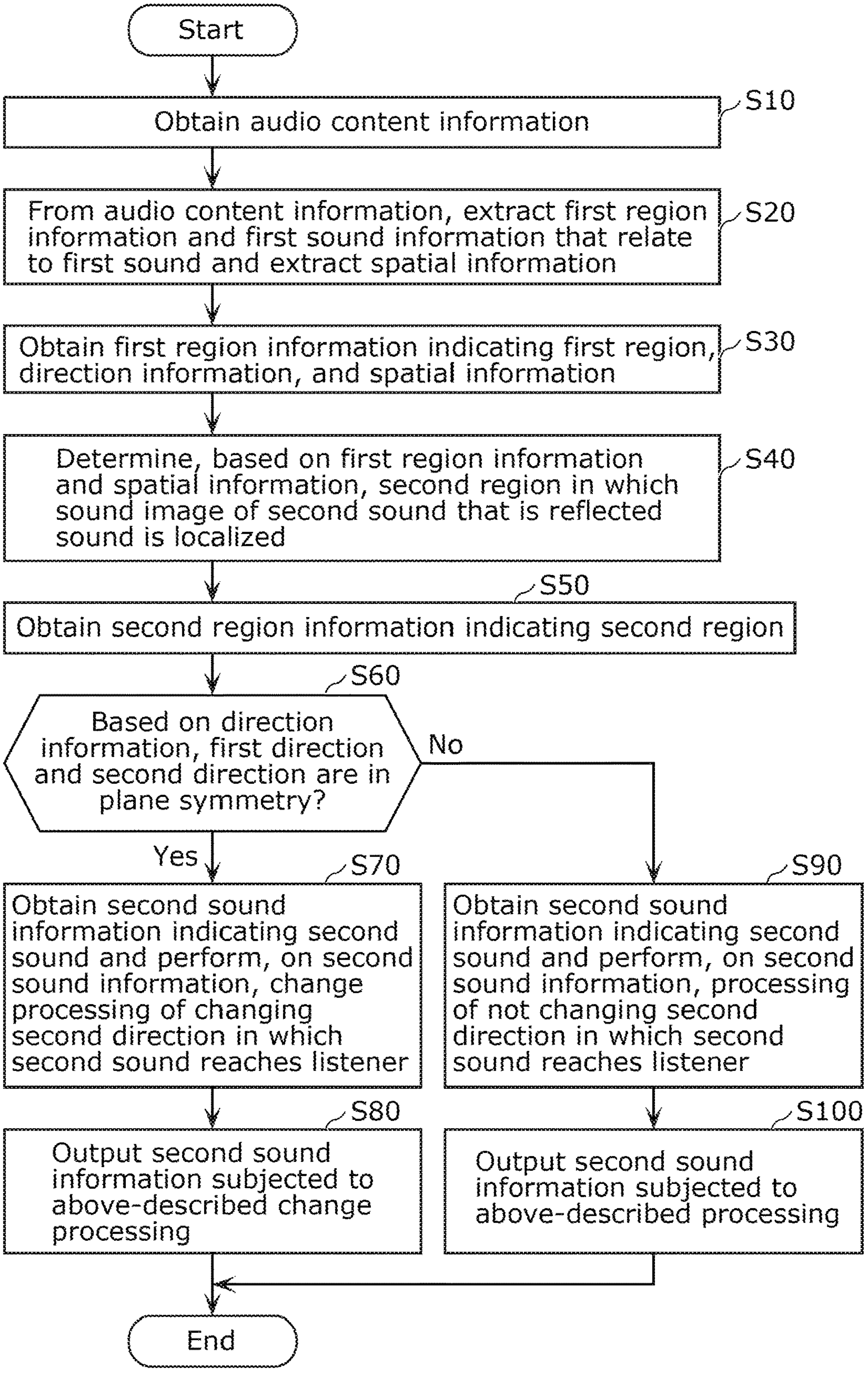
FIG. 3 is a flowchart of an operation example of the acoustic reproduction device according to Embodiment 1.

An operation example of an acoustic reproduction method performed by acoustic reproduction device 100 will be described below. FIG. 3 is a flowchart of the operation example of acoustic reproduction device 100 according to the present embodiment.

First, extractor 110 obtains audio content information (S10).

From the audio content information obtained, extractor 110 extracts first region information and first sound information that relate to a first sound and extracts spatial information (S20). More specifically, region information extractor 111 extracts the first region information included in the audio content information. Spatial information extractor 112 extracts the spatial information included in the audio content information. Sound information extractor 113 extracts the first sound information included in the audio content information. Extractor 110 outputs the first region information, first sound information, and spatial information extracted.

Further, information processor 120 obtains the first region information indicating first region A1, direction information, and the spatial information (S30). More specifically, obtainer 121 of information processor 120 obtains the first region information and spatial information output from extractor 110 and the direction information output from head sensor 201 of headphones 200. Note that step S30 is equivalent to obtaining information and direction information.

Next, determiner 122 determines, based on the first region information and spatial information obtained, a second region in which a sound image of a second sound that is a reflected sound is localized (S40). Note that step S40 is equivalent to determining.

Here, processing in step S40 will be described in more detail with reference to FIG. 4.

Figure 4:
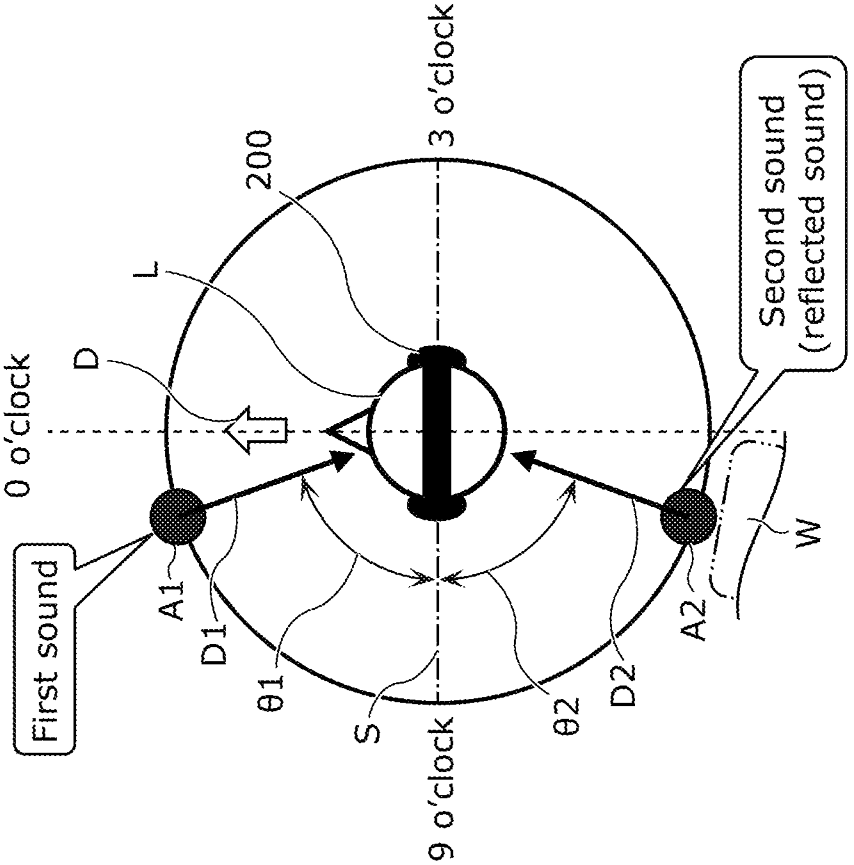
FIG. 4 is a schematic diagram for describing a second sound in the sound reproduction space according to Embodiment 1.

FIG. 4 is a schematic diagram for describing the second sound in the sound reproduction space according to the present embodiment. As with FIG. 2, FIG. 4 is a diagram of the sound reproduction space as viewed in a vertically downward direction toward listener L from above the head of listener L. This applies to FIG. 5 to FIG. 7, FIG. 10, and FIG. 11 described later.

As described above, the second sound according to the present embodiment is a reflected sound of the first sound. Based on first region A1 indicated by the first region information and an installation position and a shape of a piece of installed equipment indicated by the spatial information, determiner 122 determines whether a reflected sound of the first sound (the second sound) is present. Here, first region A1 and the installation position and the shape of the piece of installed equipment may be indicated with their coordinate positions on, for example, an x-axis, a y-axis, and a z-axis.

In FIG. 4, wall W, which is an example of the piece of installed equipment, is illustrated. In this case, the first sound reaches listener L after being reflected by wall W, and therefore the second sound that is a reflected sound of the first sound is determined to be present. Further, in the case where the second sound is present, determiner 122 determines, based on the first region information and spatial information obtained, second region A2 in which the sound image of the second sound is localized.

As described above, the first sound is a sound that reaches listener L from the forward direction of listener L in the present embodiment. Further, the second sound is here a reflected sound reaching listener L from the rearward direction of listener L.

As illustrated in FIG. 4, the second sound that is a reflected sound of the first sound is a sound that reaches listener L from second region A2 in the sound reproduction space. In addition, when viewed in a vertically downward direction toward listener L from above the head of listener L as illustrated in FIG. 4, the second sound is a sound that reaches listener L from second region A2. In FIG. 4, second region A2 is illustrated with a black dot, and a direction in which the second sound reaches listener L (second direction D2) is illustrated.

Further, determiner 122 outputs second region information that indicates second region A2 determined to judging unit 123.

Judging unit 123 obtains the second region information indicating second region A2 in which the sound image of the second sound reaching listener L is localized in the sound reproduction space (S50). More specifically, judging unit 123 obtains the second region information indicating second region A2 determined by determiner 122.

Further, judging unit 123 judges, based on the direction information obtained by obtainer 121, whether first direction D1 in which the first sound reaches listener L and second direction D2 in which the second sound reaches listener L are in plane symmetry with respect to predetermined plane S as a symmetry plane (S60). Note that step S60 is equivalent to judging.

In the present embodiment, a distance between listener L and first region A1 is the same as a distance between listener L and second region A2. Thus, the case where first direction D1 and second direction D2 are in plane symmetry is equivalent to the case where a position of first region A1 and a position of second region A2 are in plane symmetry.

Here, processing in step S60 will be described in more detail with reference to FIG. 4.

In step S60, the direction information that has been already obtained clarifies how predetermined plane S that passes through listener L and is perpendicular to direction D in which the head of listener L is oriented is positioned in the sound reproduction space. For example, in FIG. 4, direction D in which the head of listener L is oriented is the direction of 0 o'clock, and predetermined plane S extends in the directions of 3 o'clock and 9 o'clock, and a coordinate position of predetermined plane S may be clarified on, for example, an x-axis, a y-axis, and a z-axis.

The first region information and second region information that have already been obtained may also indicate, respectively, a position of first region A1 in the form of a coordinate position on, for example, an x-axis, a y-axis, and a z-axis and a position of second region A2 in the form of a coordinate position on, for example, the x-axis, the y-axis, and the z-axis.

Judging unit 123 judges, based on such information, whether first direction D1 in which the first sound reaches listener L and second direction D2 in which the second sound reaches listener L are in plane symmetry with respect to predetermined plane S as a symmetry plane. Further, judging unit 123 outputs a result of the judgment to convolution processor 130. Convolution processor 130 obtains the result of the judgment made by judging unit 123.

In FIG. 4, an angle formed between first direction D1 in which the first sound reaches listener L and predetermined plane S (may be hereinafter denoted as a first angle) is indicated as θ1. In addition, an angle formed between second direction D2 in which the second sound reaches listener L and predetermined plane S (may be hereinafter denoted as a second angle) is indicated as θ2. In the case where first direction D1 and second direction D2 are in plane symmetry, the first angle (θ1) is equal to the second angle (θ2).

As described in (Underlying Knowledge Forming Basis of the Present Disclosure), in the case where first direction D1 and second direction D2 are in plane symmetry, it is difficult for listener L to accurately perceive two sounds that reach listener L (here, the first sound and the second sound). More specifically, listener L hears the first sound and the second sound as if the first sound and the second sound come from the same direction. For example, listener L hears the first sound and the second sound as if the sound image of the first sound and the sound image of the second sound both reach listener L from first direction D1. Thus, listener L hears the sounds as if there is no longer the second sound that is a reflected sound. That is to say, in such a case, listener L fails to accurately perceive the first sound and the second sound.

In the present embodiment, the distance between listener L and first region A1 and the distance between listener L and second region A2 are the same. However, this is not limiting. That is to say, even when the distance between listener L and first region A1 and the distance between listener L and second region A2 are different from each other, the problem described in (Underlying Knowledge Forming Basis of the Present Disclosure) occurs in the case where first direction D1 and second direction D2 are in plane symmetry.

Referring again to FIG. 3, the operation example will be described.

First, the case where judging unit 123 judges that first direction D1 and second direction D2 are in plane symmetry (Yes in S60) will be described. Here, the case where the first angle and the second angle satisfy θ1=θ2=80° will be described as an example.

In this case, convolution processor 130 (second sound processor 132) obtains the second sound information indicating the second sound and performs the following processing on the second sound information. Convolution processor 130 (second sound processor 132) performs, on the second sound information obtained, processing (change processing) of changing second direction D2 in which the second sound reaches listener L in order for first direction D1 and second direction D2 not to be in plane symmetry (S70). Note that, at this time, convolution processor 130 (first sound processor 131) also performs processing on the first sound information. More specifically, first sound processor 131 performs processing of convolving the first sound information with a head-related transfer function in order for the first sound to reach listener L from first region A1. Convolution processor 130 outputs the first sound information subjected to the processing and the second sound information subjected to the change processing to first outputter 140. Note that step S70 is equivalent to performing processing.

Further, first outputter 140 outputs the second sound information subjected to the change processing and output by convolution processor 130 to headphones 200 (S80). More specifically, first outputter 140 mixes the first sound information and second sound information output by convolution processor 130 together and outputs the first sound information and second sound information mixed together to headphones 200. Note that step S80 is equivalent to outputting.

Then, second outputter 202 of headphones 200 reproduces the first sound and the second sound based on the first sound information and second sound information output by first outputter 140.

Here, a sound that reaches listener L in the sound reproduction space as a result of the operations performed in step S70 and step S80 will be described in more detail with reference to FIG. 5.

Figure 5:
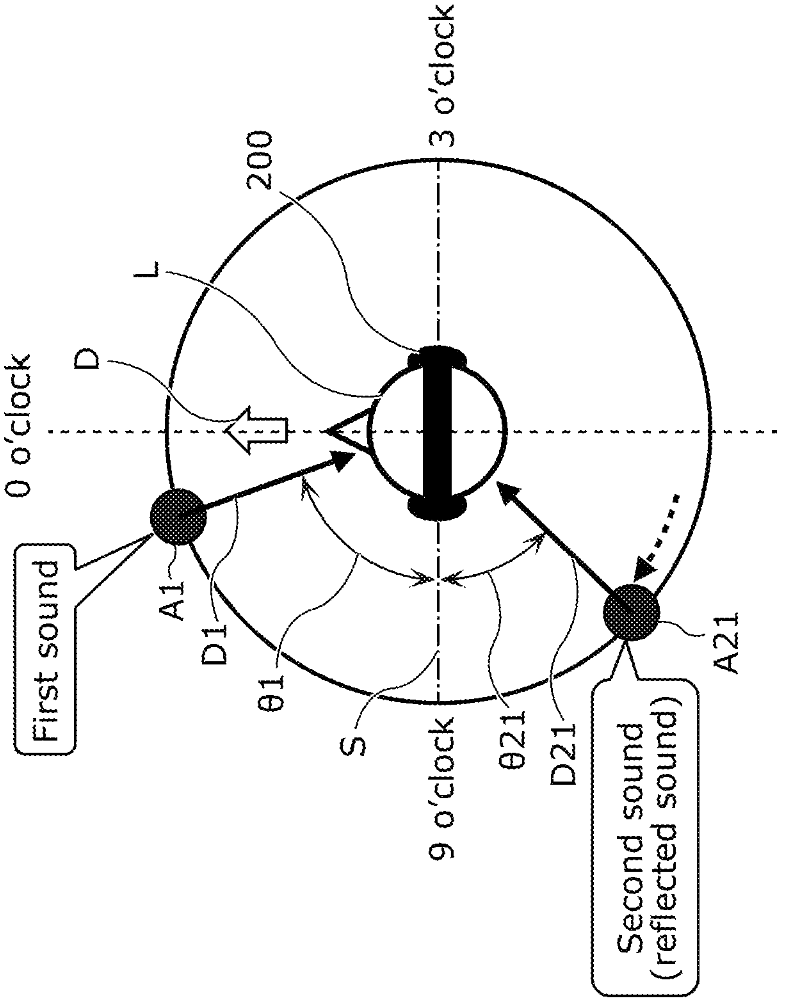
FIG. 5 is a schematic diagram illustrating the sound reproduction space after change processing is performed on second sound information.

FIG. 5 is a schematic diagram illustrating the sound reproduction space after the change processing is performed on the second sound information.

By performing the change processing, the region in which the sound image of the second sound is localized is changed from second region A2 illustrated in FIG. 4 to second region A21 illustrated in FIG. 5. That is to say, the second direction in which the second sound reaches listener L is changed from second direction D2 illustrated in FIG. 4 to second direction D21 illustrated in FIG. 5. FIG. 5 illustrates a dotted arrow, which indicates the change from second region A2 illustrated in FIG. 4 to second region A21 illustrated in FIG. 5.

Note that the first sound information is subjected to processing by first sound processor 131 in order for the first sound to reach listener L from first region A1. Thus, as illustrated in FIG. 5, the first sound reaches listener L from first region A1.

In addition, performing the change processing on the second sound information changes the second angle formed between the second direction in which the second sound reaches listener L and predetermined plane S from θ2 illustrated in FIG. 4 to θ21 illustrated in FIG. 5. Thus, performing the change processing on the second sound information makes the first angle (θ1) and the second angle (θ21) have different values. Thus, such a problem as described above that listener L hears the first sound and the second sound as if the first sound and the second sound come from the same direction is inhibited from occurring.

The absolute value of a difference between θ2 and θ21 (i.e., |θ2−θ21|) may be 4° or more and 20° or less, may be 6° or more and 15° or less, and may further be 8° or more and 12° or less. For example, θ21=70° is established while θ1=θ2=80° as described above. When the absolute value of the difference between θ2 and θ21 is within the above ranges, the occurrence of the above problem is sufficiently inhibited.

To summarize the above, the acoustic reproduction method according to the present embodiment includes obtaining information and direction information, judging, performing processing, and outputting.

The obtaining of information and direction information includes obtaining first region information indicating first region A1 in which a sound image of a first sound is localized and direction information indicating direction D in which the head of listener L is oriented. Here, the first sound is an object sound that reaches listener L in a sound reproduction space. A plane which passes through both ears of listener L and which is perpendicular to direction D in which the head of listener L is oriented is defined as predetermined plane S. The judging includes: obtaining second region information indicating second region A2 in which a sound image of a second sound that reaches listener L in the sound reproduction space is localized; and judging, based on the direction information obtained, whether first direction D1 in which the first sound reaches listener L and second direction D2 in which the second sound reaches listener L are in plane symmetry with respect to predetermined plane S as a symmetry plane. The performing of processing includes: obtaining sound information indicating the second sound (second sound information) when first direction D1 and second direction D2 are judged to be in plane symmetry; and performing, on the second sound information obtained, change processing of changing second direction D2 in order for first direction D1 and second direction D2 not to be in plane symmetry. The outputting includes outputting the second sound information subjected to the change processing.

Accordingly, first direction D1 and second direction D21 are not in a plane-symmetric relation. Further, θ1 that is an angle formed between first direction D1 in which the first sound reaches listener L and predetermined plane S (the first angle) is different from θ21 that is an angle formed between second direction D21 in which the second sound reaches listener L and predetermined plane S (the second angle). Thus, such a problem as described above that listener L hears the first sound and the second sound as if the first sound and the second sound come from the same direction is inhibited from occurring. Therefore, listener L can accurately perceive the first sound and the second sound. That is to say, an acoustic reproduction method that makes it easier for listener L to accurately perceive two sounds reaching listener L is implemented.

In the change processing according to the present embodiment, a distance between the second sound and listener L is kept constant. Further, in the change processing according to the present embodiment, an intensity of the second sound is kept constant.

Even when the distance between the second sound and listener L and the intensity of the second sound are kept constant in this manner, performing the change processing according to the present embodiment sufficiently inhibits the occurrence of the problem.

In the present embodiment, the obtaining of the information and the direction information includes obtaining spatial information indicating a shape of the sound reproduction space. The acoustic reproduction method includes determining, based on the first region information obtained and the spatial information obtained, second region A2 in which the sound image of the second sound is localized. Here, the second sound is a reflected sound of the first sound. In the judging, the second region information indicating second region A2 determined is obtained. In the performing of the processing, sound information indicating the first sound (first sound information) is obtained as the sound information indicating the second sound (second sound information).

Accordingly, even in the case where the second sound is a reflected sound of the first sound, an acoustic reproduction method which makes it easier for listener L to accurately perceive two sounds reaching listener L is implemented.

In the present embodiment, the change processing is performed such that the second angle satisfies θ2>θ21. That is to say, in the performing of the processing, the change processing of shifting second direction D2 to increase at least one of an interaural level difference of the second sound or an interaural time difference of the second sound may be performed. An interaural level difference of the second sound indicates a difference in intensity of the second sound between both ears of listener L, and an interaural time difference of the second sound indicates a difference in reaching time of the second sound between both ears of listener L.

Accordingly, by shifting second direction D2 in which the second sound reaches listener L, a relation between θ1 and θ21 is as follows. That is to say, θ1 that is an angle formed between first direction D1 in which the first sound reaches listener L and predetermined plane S (the first angle) is different from θ21 that is an angle formed between second direction D21 in which the second sound reaches listener L and predetermined plane S (the second angle). Further, as the interaural level difference of the second sound increases, it becomes easier for listener L to perceive second direction D21 in which the second sound reaches listener L. Likewise, as the interaural time difference of the second sound increases, it becomes easier for listener L to perceive second direction D21 in which the second sound reaches listener L. Accordingly, an acoustic reproduction method which, by increasing at least one of the interaural level difference or the interaural time difference, makes it easier for listener L to more accurately perceive the two sounds reaching listener L is implemented.

Note that the change processing may be performed such that the second angle satisfies θ2<θ21, unlike the present embodiment. That is to say, change processing of shifting second direction D2 in which the second sound reaches listener L to decrease both the interaural level difference of the second sound and the interaural time difference of the second sound may be performed. Even in this case, listener L can accurately perceive the first sound and the second sound.

Further, a program according to the present embodiment may be a program for causing a computer to execute the acoustic reproduction method described above.

Accordingly, the computer can execute the above-described acoustic reproduction method according to the program.

Further, acoustic reproduction device 100 according to the present embodiment includes obtainer 121, judging unit 123, a processor (second sound processor 132), and an outputter (first outputter 140). Obtainer 121 obtains first region information indicating first region A1 in which a sound image of a first sound is localized and direction information indicating a direction in which a head of listener L is oriented, the first sound being an object sound that reaches listener L in a sound reproduction space. A plane passing through both ears of listener L and being perpendicular to direction D in which the head of listener L is oriented is defined as predetermined plane S. Judging unit 123 obtains second region information indicating second region A2 in which a sound image of a second sound that reaches listener L in the sound reproduction space is localized. Judging unit 123 judges, based on the direction information obtained, whether first direction D1 in which the first sound reaches listener L and second direction D2 in which the second sound reaches listener L are in plane symmetry with respect to predetermined plane S as a symmetry plane. When first direction D1 and second direction D2 are judged to be in plane symmetry, second sound processor 132 obtains sound information (second sound information) indicating the second sound, and performs, on the second sound information obtained, change processing of changing second direction D2 in order for first direction D1 and second direction D2 not to be in plane symmetry. First outputter 140 outputs the second sound information subjected to the change processing.

Accordingly, first direction D1 and second direction D21 are not in a plane-symmetric relation. Further, θ1 that is an angle formed between first direction D1 in which the first sound reaches listener L and predetermined plane S (the first angle) is different from θ21 that is an angle formed between second direction D21 in which the second sound reaches listener L and predetermined plane S (the second angle). Thus, such a problem as described above that listener L hears the first sound and the second sound as if the first sound and the second sound come from the same direction is inhibited from occurring. Therefore, listener L can accurately perceive the first sound and the second sound. That is to say, acoustic reproduction device 100 that makes it easier for listener L to accurately perceive two sounds reaching listener L is implemented.

The case where judging unit 123 judges that first direction D1 and second direction D2 are not in plane symmetry (No in S60) will be described. That is to say, the case of θ1≠θ2 will be described.

In this case, convolution processor 130 (second sound processor 132) obtains the second sound information indicating the second sound and performs, on the second sound information obtained, processing of not changing second direction D2 in which the second sound reaches listener L (S90). More specifically, second sound processor 132 performs processing of convolving the second sound information with a head-related transfer function in order for the second sound to reach listener L from second region A2. That is to say, unlike step S70, second sound processor 132 performs the processing different from the change processing on the second sound information. Note that, at this time, convolution processor 130 (first sound processor 131) also performs processing on the first sound information as in step S70. More specifically, first sound processor 131 performs processing of convolving the first sound information with a head-related transfer function in order for the first sound to reach listener L from first region A1. Convolution processor 130 outputs the first sound information subjected to the processing and the second sound information subjected to the processing to first outputter 140.

Further, first outputter 140 outputs the second sound information subjected to the processing and output by convolution processor 130 to headphones 200 (S100). More specifically, first outputter 140 mixes the first sound information and second sound information output by convolution processor 130 together and outputs the first sound information and second sound information mixed together to headphones 200.

Then, second outputter 202 of headphones 200 reproduces the first sound and the second sound based on the first sound information and second sound information output by first outputter 140.

In the case of No in S60, that is, in the case of θ1 ≠θ2, such a problem that listener L hears the first sound and the second sound as if the first sound and the second sound come from the same direction does not occur. That is to say, in this case, too, an acoustic reproduction method which makes it easier for listener L to accurately perceive two sounds reaching listener L is implemented.

The case where direction D in which the head of listener L is oriented is slightly changed while listener L is listening to the first sound and the second sound illustrated in FIG. 5 will be described with reference to FIG. 6.

Figure 6:
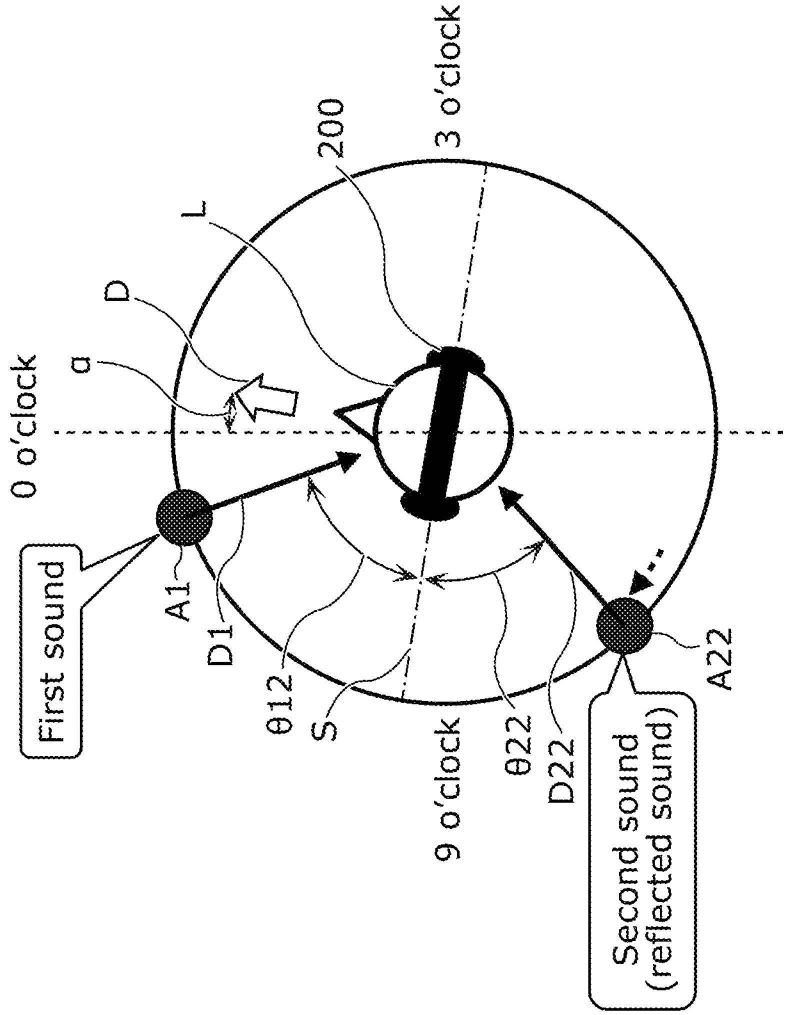
FIG. 6 is a schematic diagram illustrating an example of the sound reproduction space according to Embodiment 1 in the case where the direction in which the head of a listener is oriented is changed.

FIG. 6 is a schematic diagram illustrating an example of the sound reproduction space according to the present embodiment in the case where direction D in which the head of listener L is oriented is changed.

In FIG. 5, direction D in which the head of listener L is oriented is the direction of 0 o'clock. Here, as illustrated in FIG. 6, an angle formed between direction D in which the head of listener L is oriented and the direction of 0 o'clock is α. That is to say, in the state of FIG. 6, direction D in which the head of listener L is oriented is rotated clockwise by α as compared with the state of FIG. 5. Note that α is, for example, 0° or more and 10° or less and has a value as very small as 2°, for instance.

In addition, since direction D in which the head of listener L is oriented is changed clockwise, predetermined plane S is also changed clockwise.

In the case where a has a very small value such as 2° as in this case, second sound processor 132 further performs processing on the second sound information obtained. More specifically, second sound processor 132 here performs, on the second sound information, keeping processing of keeping an angle formed between second direction D22 in which the second sound reaches listener L and predetermined plane S (the second angle) constant.

That is to say, in FIG. 6 illustrating the case where the keeping processing is performed, the second angle is θ22, and the second angle is kept constant. Therefore, θ22=θ21 is established. As seen from the above, in the case where a has a very small value, the second angle is kept before and after the keeping processing is performed.

Note that since predetermined plane S is rotated, performing the keeping processing causes the sound image of the second sound to be localized in second region A22, which is a region different from second region A21 illustrated in FIG. 5. FIG. 6 illustrates a dotted arrow, which indicates the change from second region A21 illustrated in FIG. 5 to second region A22 illustrated in FIG. 6.

At this time, the first angle being an angle formed between first direction D1 in which the first sound reaches listener L and predetermined plane S is θ12 and satisfies θ12=θ1−α. Note that α is negligible because of its very small value, and thus θ12=θ1 is established. In contrast, the second angle satisfies θ22=θ21. As described above with reference to FIG. 5, since θ1 being the first angle and second angle θ21 have different values, θ12 being the first angle (i.e., θ1) and θ22 being the second angle (i.e., θ21) also have different values in FIG. 6. At this time, first direction D1 and second direction D22 are not in plane symmetry. Thus, such a problem as described above that listener L hears the first sound and the second sound as if the first sound and the second sound come from the same direction is inhibited from occurring.

As a hypothetical case, the case where the second sound reaches listener L from, for example, second region A2 illustrated in FIG. 4 as the change processing is not performed on the second sound information when a has a very small value as illustrated in FIG. 6 will be described. In this case, the angle formed between first direction D1 in which the first sound reaches listener L and predetermined plane S (the first angle) is θ1−α. Likewise, the angle formed between second direction D2 in which the second sound reaches listener L and predetermined plane S (the second angle) is θ2+α. Since α is negligible because of its very small value, the first angle is θ1, the second angle is θ2, and when θ1=θ2 is satisfied, first direction D1 and second direction D2 are in plane symmetry. That is to say, in the case where a has a very small value, not performing the keeping processing on the second sound information raises such a problem that listener L hears the first sound and the second sound as if the first sound and the second sound come from the same direction.

The case where direction D in which the head of listener L is oriented is greatly changed while listener L is listening to the first sound and the second sound illustrated in FIG. 5 will be described with reference to FIG. 7.

Figure 7:
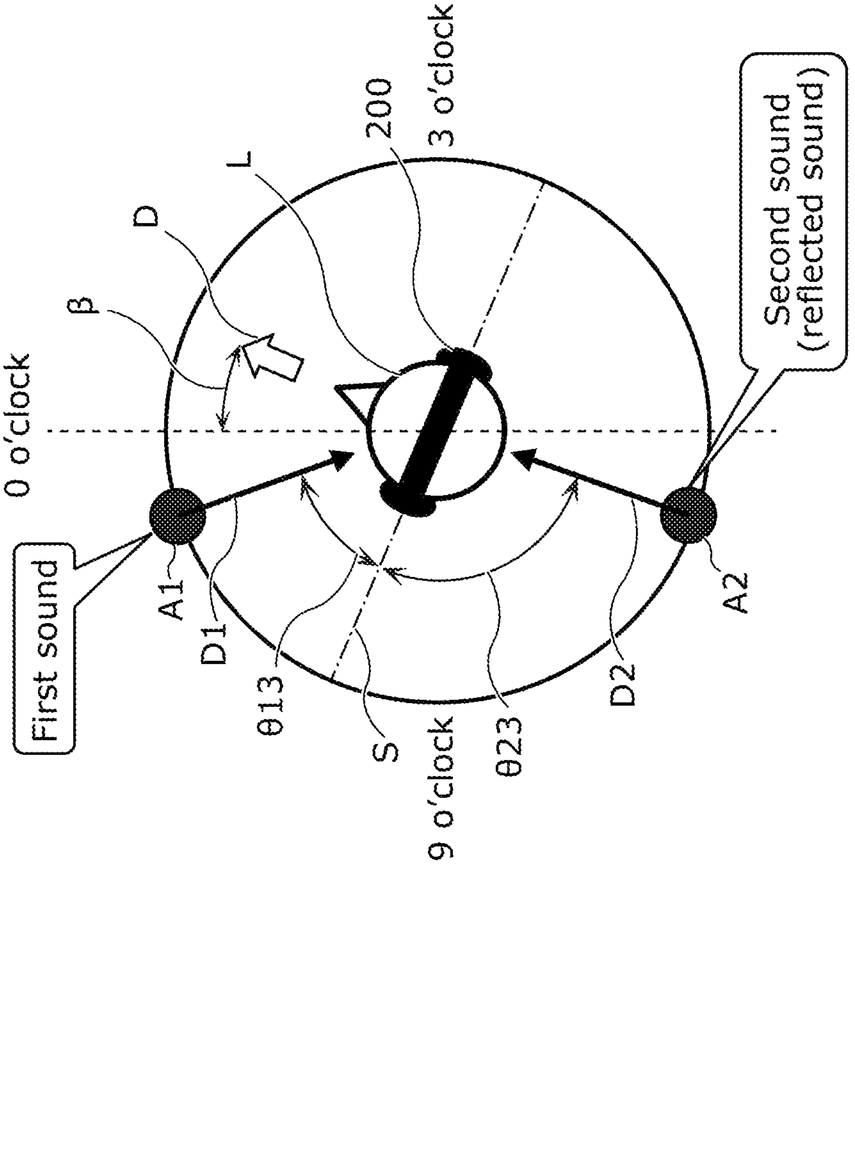
FIG. 7 is a schematic diagram illustrating another example of the sound reproduction space according to Embodiment 1 in the case where the direction in which the head of the listener is oriented is changed.

FIG. 7 is a schematic diagram illustrating another example of the sound reproduction space according to the present embodiment in the case where direction D in which the head of listener L is oriented is changed.

In FIG. 5, direction D in which the head of listener L is oriented is the direction of 0 o'clock. Here, as illustrated in FIG. 7, an angle formed between direction D in which the head of listener L is oriented and the direction of 0 o'clock is β. That is to say, in the state of FIG. 7, direction D in which the head of listener L is oriented is rotated clockwise by β as compared with the state of FIG. 5. Note that β is, for example, 10° or more and 90° or less and has a value as large as 30°, for instance.

In addition, since direction D in which the head of listener L is oriented is changed clockwise, predetermined plane S is also changed clockwise.

In the case where β has a large value as in this case, second sound processor 132 performs processing of convolving the second sound information with a head-related transfer function in order for the second sound to reach listener L from second region A2 as in step S90.

In this case, the second angle is θ23 and more specifically satisfies θ23=θ2+β. At this time, the first angle being an angle formed between first direction D1 in which the first sound reaches listener L and predetermined plane S is θ13 and satisfies θ13=θ1−β.

θ13 being the first angle (i.e., θ1−β) and second angle θ23 (i.e., θ2+β) have different values, and first direction D1 and second direction D2 are not in plane symmetry. Thus, such a problem as described above that listener L hears the first sound and the second sound as if the first sound and the second sound come from the same direction is inhibited from occurring. In other words, in the case where direction D in which the head of listener L illustrated in FIG. 7 is oriented is changed greatly, second direction D2 in which the second sound reaches listener L need not be changed.

Embodiment 2

In Embodiment 1, the second sound is a reflected sound of the first sound, and the sound information indicating the first sound (the first sound information) is obtained as the sound information indicating the second sound (the second sound information). However, this is not limiting. In Embodiment 2, a second sound is an object sound different from a first sound, and second sound information indicating the second sound is extracted and obtained from audio content information.

[Configuration]

Now, a configuration of acoustic reproduction device 100*a* according to Embodiment 2 will be described.

Figure 8:
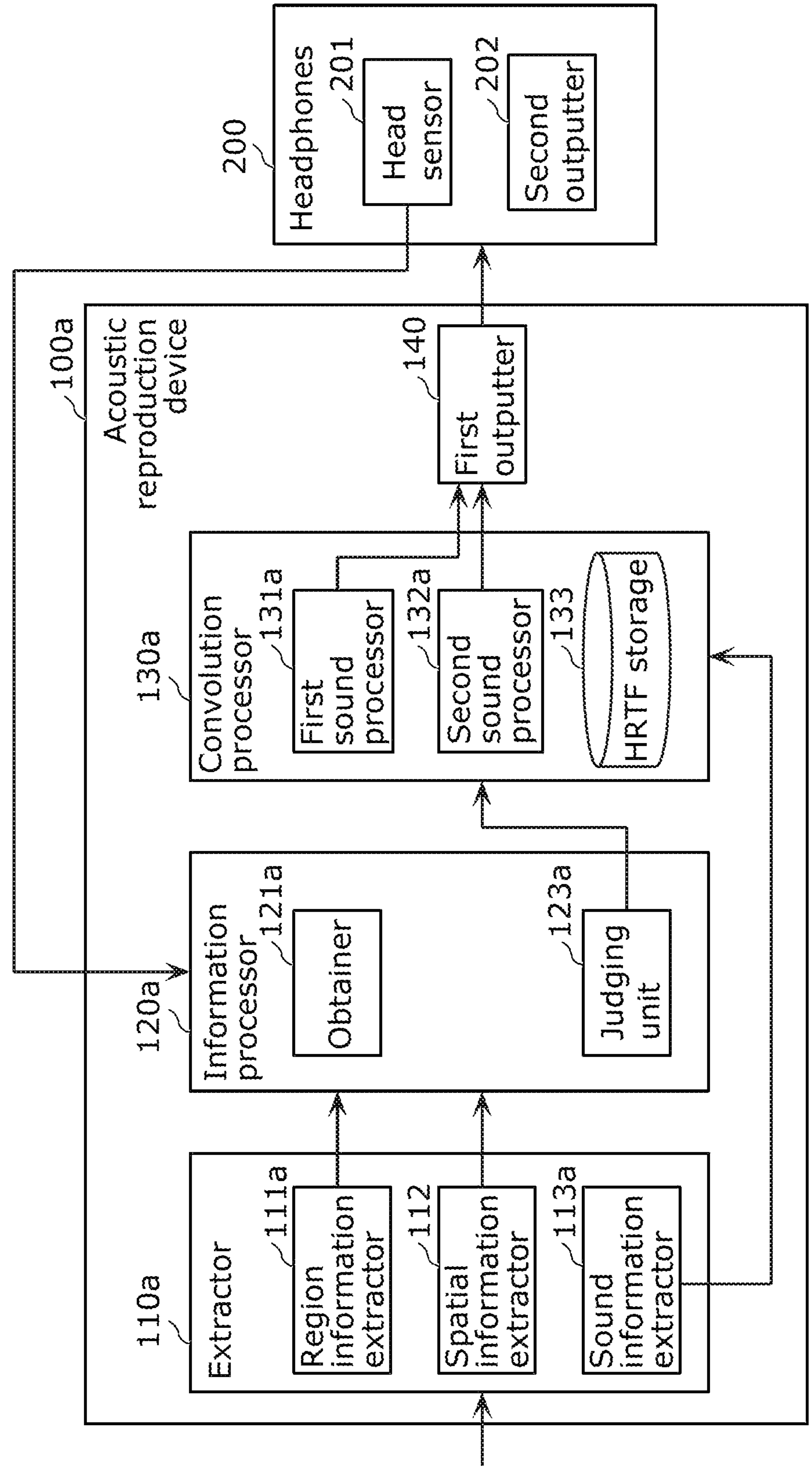
FIG. 8 is a block diagram illustrating a functional configuration of an acoustic reproduction device according to Embodiment 2.

FIG. 8 is a block diagram illustrating a functional configuration of acoustic reproduction device 100*a* according to the present embodiment.

The main differences between acoustic reproduction device 100*a* according to the present embodiment and acoustic reproduction device 100 are that acoustic reproduction device 100*a* includes extractor 110*a* instead of extractor 110, information processor 120*a* instead of information processor 120, convolution processor 130*a* instead of convolution processor 130.

That is to say, acoustic reproduction device 100*a* includes extractor 110*a*, information processor 120*a*, convolution processor 130*a*, and first outputter 140.

As described above, the second sound according to the present embodiment is an object sound different from the first sound. The first sound and the second sound are both object sounds and may be, but not particularly limited to, sounds caused by persons, such as a voice of a singing person, a voice of a speaking person, a sound of clapping by a person, or sounds caused by objects other than a person, such as a driving sound of a vehicle. Here, the first sound is assumed to be a voice of a singing female, and the second sound assumed to be a voice of a speaking male. In the present embodiment, information relating to such a first sound and a second sound is included in the audio content information.

The following description will be given mainly of differences between acoustic reproduction device 100*a* according to the present embodiment and acoustic reproduction device 100 according to Embodiment 1.

Extractor 110*a* includes region information extractor 111*a*, spatial information extractor 112, and sound information extractor 113*a*.

Region information extractor 111*a* extracts first region information and second region information that are included in the audio content information obtained. The second region information is information that indicates second region A2 in which the sound image of the second sound is localized. More specifically, the second region information is information that indicates a position of second region A2 in the sound reproduction space.

Sound information extractor 113*a* extracts first sound information and second sound information that are included in the audio content information obtained. The second sound information is information that indicates the second sound that is an object sound. The second sound information is digital data that is given in the form of WAVE, MP3, WMA, or the like.

Information processor 120*a* judges, based on the first region information, the second sound information, the spatial information, and the direction information, a position relationship between first region A1 in which the sound image of the first sound is localized and second region A2 in which a sound image of the second sound is localized. Information processor 120*a* includes obtainer 121*a* and judging unit 123*a*. That is to say, unlike information processor 120 according to Embodiment 1, information processor 120*a* need not include determiner 122.

Obtainer 121*a* obtains the first region information, the second region information, and the spatial information that are extracted by extractor 110*a*. More specifically, obtainer 121*a* obtains the first region information and the second region information extracted by region information extractor 111*a* and the spatial information extracted by spatial information extractor 112. In addition, obtainer 121*a* obtains the direction information sensed by headphones 200 (more specifically, head sensor 201).

Judging unit 123*a* obtains the second region information indicating second region A2 in which the sound image of the second sound reaching listener L is localized in the sound reproduction space. In the present embodiment, judging unit 123*a* obtains the second region information extracted by extractor 110*a* and obtained by obtainer 121*a*. Further, judging unit 123*a* judges, based on the direction information obtained by obtainer 121*a*, whether first direction D1 in which the first sound reaches listener L and second direction D2 in which the second sound reaches listener L are in plane symmetry with respect to predetermined plane S as a symmetry plane. Further, judging unit 123*a* outputs a result of the judgment to convolution processor 130*a*.

Convolution processor 130*a* performs, based on the result of the judgment made by judging unit 123*a*, processing on the sound information indicating the first sound (the first sound information) and the sound information indicating the second sound (the second sound information). Convolution processor 130*a* includes first sound processor 131*a*, second sound processor 132*a*, and HRTF storage 133.

First sound processor 131*a* performs processing on the first sound information with reference to a head-related transfer function that is stored in HRTF storage 133. More specifically, first sound processor 131*a* performs processing of convolving the first sound information with the head-related transfer function in order for the first sound to reach listener L from first region A1 indicated by the first region information obtained by obtainer 121*a*. First sound processor 131*a* obtains the first sound information extracted from the audio content information by sound information extractor 113*a* of extractor 110*a* and performs the processing on the first sound information obtained.

Second sound processor 132*a* performs processing on the second sound information with reference to a head-related transfer function that is stored in HRTF storage 133. More specifically, second sound processor 132*a* performs processing of convolving the second sound information with the head-related transfer function in order for the second sound to reach listener L from second region A2 indicated by the second region information extracted by extractor 110*a*. Second sound processor 132*a* obtains the second sound information extracted from the audio content information by sound information extractor 113*a* of extractor 110*a* and performs the processing on the second sound information obtained.

In the case where judging unit 123*a* judges that first direction D1 and second direction D2 are in plane symmetry, second sound processor 132*a* performs the following processing. Second sound processor 132*a* obtains the second sound information and performs, on the second sound information obtained, processing (change processing) of changing second direction D2 in which the second sound reaches listener L in order for first direction D1 and second direction D2 not to be in plane symmetry.

The first sound information subjected to the processing by first sound processor 131*a* is output to first outputter 140. Likewise, the second sound information subjected to the processing by second sound processor 132*a* is output to first outputter 140.

Operation Example

Figure 9:
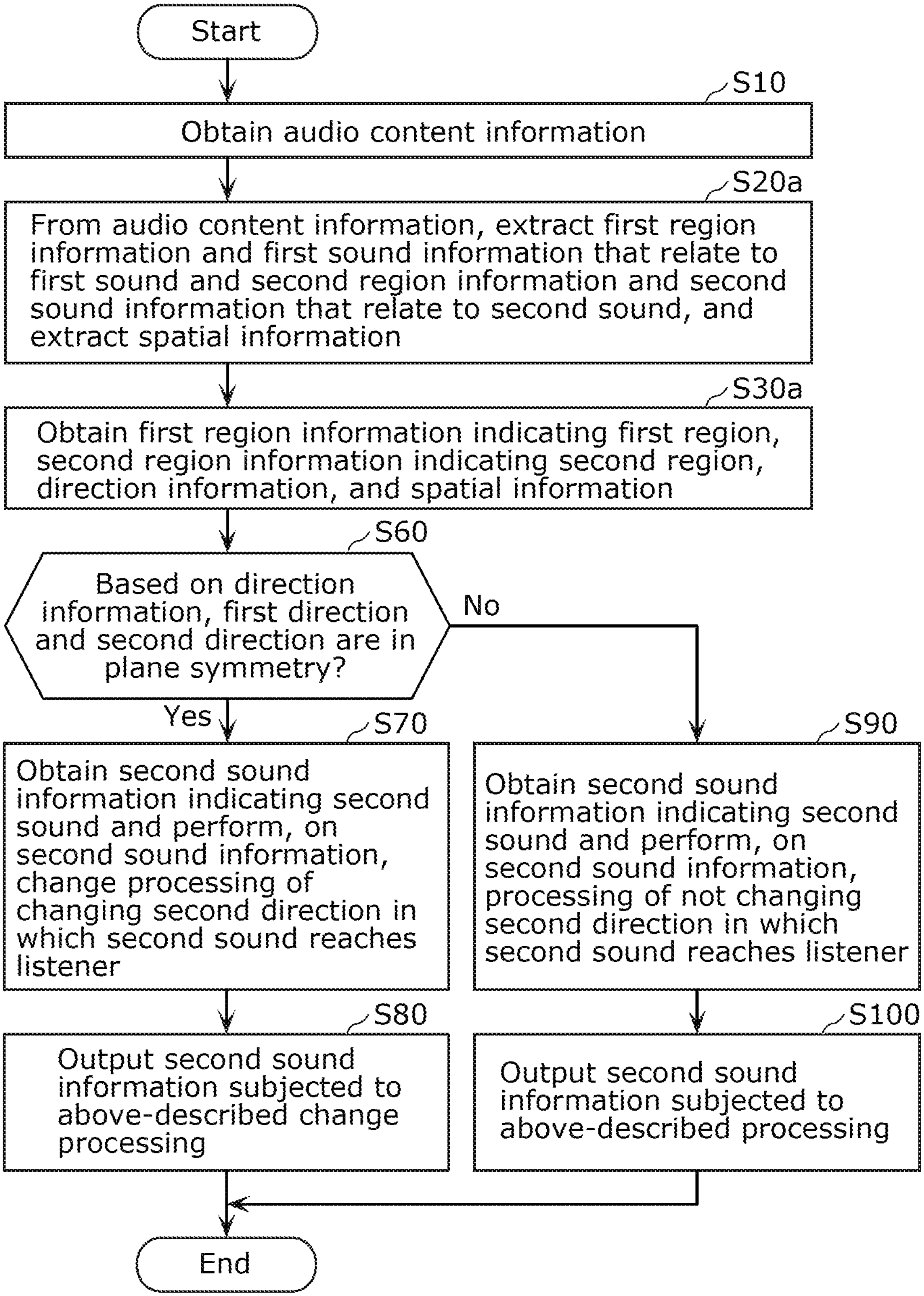
FIG. 9 is a flowchart of an operation example of the acoustic reproduction device according to Embodiment 2.

An operation example of an acoustic reproduction method performed by acoustic reproduction device 100*a* will be described below. FIG. 9 is a flowchart of the operation example of acoustic reproduction device 100*a* according to the present embodiment.

First, extractor 110*a* obtains audio content information (S10).

From the audio content information obtained, extractor 110*a* extracts first region information and first sound information that relate to a first sound and second region information and second sound information that relate to a second sound, and extracts spatial information (S20*a*). More specifically, region information extractor 111*a* extracts the first region information and the second region information included in the audio content information. Spatial information extractor 112 extracts the spatial information included in the audio content information. Sound information extractor 113*a* extracts the first sound information and the second sound information included in the audio content information. Extractor 110*a* outputs the first region information, first sound information, second region information, second sound information, and spatial information extracted. Note that step 20*a* is equivalent to extracting information.

Further, information processor 120*a* obtains the first region information indicating first region A1, the second region information indicating second region A2, direction information, and the spatial information (S30*a*). More specifically, obtainer 121*a* of information processor 120*a* obtains the first region information, second region information, and spatial information output from extractor 110*a* and the direction information output from head sensor 201 of headphones 200. Obtainer 121*a* outputs the first region information indicating first region A1, the second region information indicating second region A2, the direction information, and the spatial information to judging unit 123*a*.

Further, judging unit 123*a* judges, based on the direction information obtained by obtainer 121*a*, whether first direction D1 in which the first sound reaches listener L and second direction D2 in which the second sound reaches listener L are in plane symmetry with respect to predetermined plane S as a symmetry plane (S60).

Figure 10:
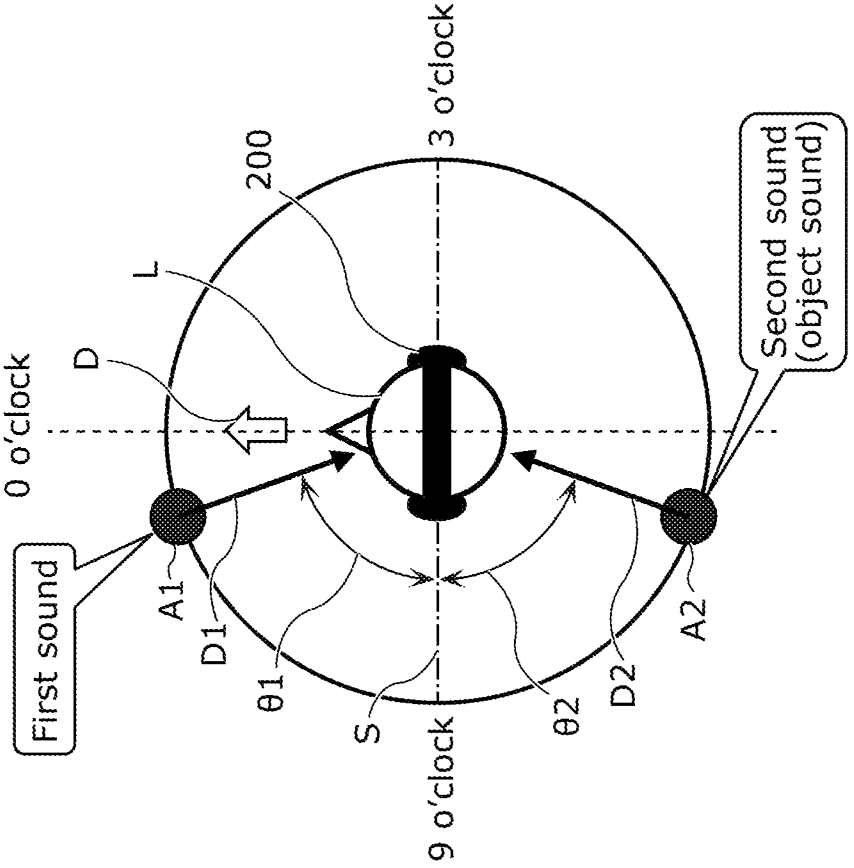
FIG. 10 is a schematic diagram for describing a second sound in the sound reproduction space according to Embodiment 2.

Here, processing in step S60 in the operation example according to the present embodiment will be described in more detail with reference to FIG. 10. FIG. 10 is a schematic diagram for describing the second sound in the sound reproduction space according to the present embodiment.

In step S60 according to the present embodiment, the same processing as in step S60 according to Embodiment 1 may be performed. That is to say, judging unit 123*a* may perform the judgment described above based on a coordinate position of predetermined plane S on, for example, an x-axis, a y-axis, and a z-axis, a coordinate position of first region A1 on, for example, the x-axis, the y-axis, and the z-axis, and a coordinate position of second region A2 on, for example, the x-axis, the y-axis, and the z-axis.

Judging unit 123*a* outputs a result of the judgment to convolution processor 130*a*. Convolution processor 130*a* obtains the result of the judgment made by judging unit 123*a*.

In FIG. 10, the first angle is indicated as θ1 and the second angle is indicated as θ2. In the case where first direction D1 and second direction D2 are in plane symmetry, the first angle (θ1) is equal to the second angle (θ2). In this case, it is difficult for listener L to accurately perceive two sounds that reach listener L (here, the first sound and the second sound). More specifically, listener L hears the first sound and the second sound as if the first sound and the second sound come from the same direction, and thus listener L fails to accurately perceive the first sound and the second sound.

Referring again to FIG. 9, the operation example will be described.

First, the case where judging unit 123*a* judges that first direction D1 and second direction D2 are in plane symmetry (Yes in S60) will be described.

In this case, second sound processor 132*a* obtains the second sound information indicating the second sound and performs, on the second sound information obtained, processing (change processing) of changing second direction D2 in which the second sound reaches listener L in order for first direction D1 and second direction D2 not to be in plane symmetry (S70). Note that, at this time, first sound processor 131*a* also performs processing on the first sound information. More specifically, first sound processor 131*a* performs processing of convolving the first sound information with a head-related transfer function in order for the first sound to reach listener L from first region A1. Convolution processor 130*a* outputs the first sound information subjected to the processing and the second sound information subjected to the change processing to first outputter 140.

Further, first outputter 140 outputs the second sound information subjected to the change processing and output by convolution processor 130*a* to headphones 200 (S80).

Then, second outputter 202 of headphones 200 reproduces the first sound and the second sound based on the first sound information and second sound information output by first outputter 140.

Here, a sound that reaches listener L in the sound reproduction space as a result of the operations performed in step S70 and step S80 in the operation example according to the present embodiment will be described in more detail with reference to FIG. 11.

Figure 11:
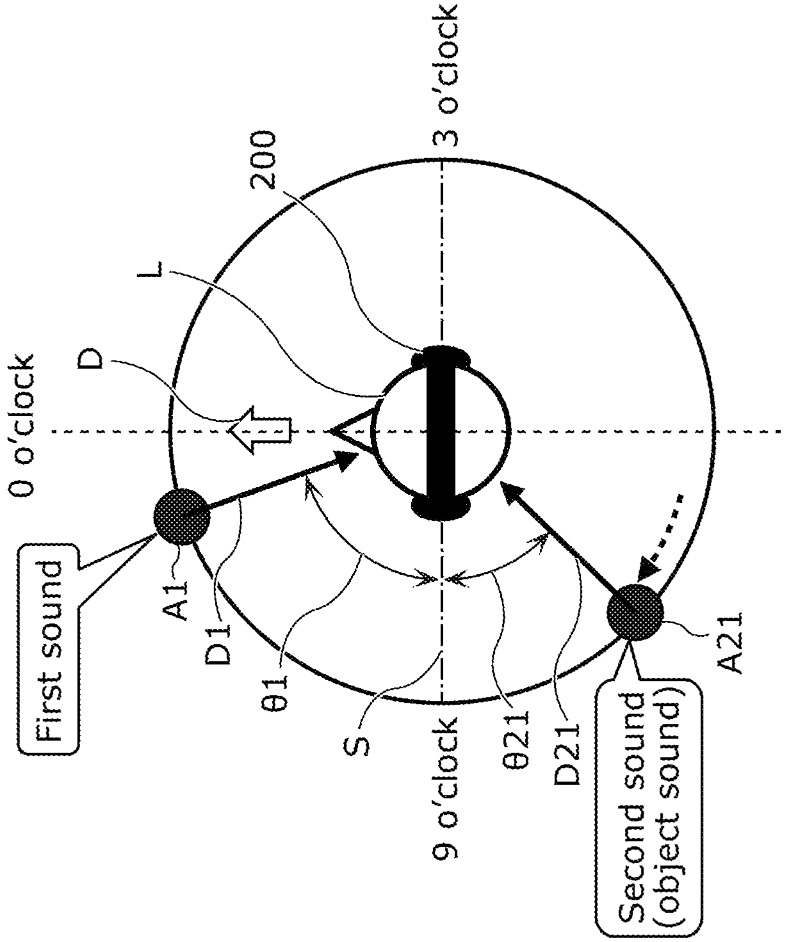
FIG. 11 is a schematic diagram illustrating the sound reproduction space after change processing is performed on second sound information.

FIG. 11 is a schematic diagram illustrating the sound reproduction space after the change processing is performed on the second sound information.

By performing the change processing, the region in which the sound image of the second sound is localized is changed from second region A2 illustrated in FIG. 10 to second region A21 illustrated in FIG. 11. That is to say, the second direction in which the second sound reaches listener L is changed from second direction D2 illustrated in FIG. 10 to second direction D21 illustrated in FIG. 11.

Note that the first sound information is subjected to processing by first sound processor 131*a* in order for the first sound to reach listener L from first region A1. Thus, as illustrated in FIG. 11, the first sound reaches listener L from first region A1.

In addition, performing the change processing on the second sound information changes the second angle formed between the second direction in which the second sound reaches listener L and predetermined plane S from θ2 illustrated in FIG. 10 to θ21 illustrated in FIG. 11. Thus, performing the change processing on the second sound information makes the first angle (θ1) and the second angle (θ21) have different values. Thus, such a problem as described above that listener L hears the first sound and the second sound as if the first sound and the second sound come from the same direction is inhibited from occurring.

That is to say, in the present embodiment, the second sound is an object sound different from the first sound. The acoustic reproduction method includes extracting information. The extracting of information includes: obtaining audio content information; and extracting the first region information, the second region information, and the sound information (the second sound information) that are included in the audio content information obtained. In the obtaining of the information and the direction information, the first region information extracted is obtained. In the judging, the second region information extracted is obtained. In the performing of processing, the sound information (the second sound information) extracted is obtained.

Accordingly, even in the case where the second sound is an object sound different from the first sound, an acoustic reproduction method which makes it easier for listener L to accurately perceive two sounds reaching listener L is implemented.

The case where judging unit 123*a* judges that first direction D1 and second direction D2 are not in plane symmetry (No in S60) will be described. That is to say, the case of θ1≠θ2 will be described.

In this case, second sound processor 132*a* obtains the second sound information indicating the second sound and performs, on the second sound information obtained, processing of not changing second direction D2 in which the second sound reaches listener L (S90). More specifically, second sound processor 132*a* performs processing of convolving the second sound information with a head-related transfer function in order for the second sound to reach listener L from second region A2. That is to say, unlike step S70, second sound processor 132*a* performs the processing different from the change processing on the second sound information. Note that, at this time, first sound processor 131*a* also performs processing on the first sound information as in step S70. More specifically, first sound processor 131*a* performs processing of convolving the first sound information with a head-related transfer function in order for the first sound to reach listener L from first region A1. Convolution processor 130*a* outputs the first sound information subjected to the processing and the second sound information subjected to the processing to first outputter 140.

Further, first outputter 140 outputs the second sound information subjected to the processing and output by convolution processor 130*a* to headphones 200 (S100).

Then, second outputter 202 of headphones 200 reproduces the first sound and the second sound based on the first sound information and second sound information output by first outputter 140.

In the case of No in S60, that is, in the case of θ1 ≠θ2, such a problem that listener L hears the first sound and the second sound as if the first sound and the second sound come from the same direction does not occur. That is to say, in this case, too, an acoustic reproduction method which makes it easier for listener L to accurately perceive two sounds reaching listener L is implemented.

OTHER EMBODIMENTS

The acoustic reproduction device and the acoustic reproduction method according to an aspect of the present disclosure have been described thus far based on embodiments, but the present disclosure is not limited to the embodiments. For example, different embodiments implemented by arbitrarily combining the constituent elements described in the present specification or by excluding one or more of the constituent elements may be regarded as embodiments of the present disclosure. Moreover, the present disclosure also encompasses variations achieved by making various modifications conceived by a person skilled in the art to the embodiments described above, as long as such modifications do not depart from the essential spirit of the present disclosure, that is, the meaning of the wording recited in the claims.

In addition, the forms described below may also be included in the scope of one or more aspects of the present disclosure.

(1) One or more of the constituent elements included in the acoustic reproduction device described above may be a computer system including a microprocessor, a ROM, a random-access memory (RAM), a hard disk unit, a display unit, a keyboard, a mouse, etc. A computer program is stored in the RAM or the hard disk unit. The function is achieved as a result of the microprocessor operating according to the computer program. Here, the computer program is configured by combining a plurality of instruction codes indicating instructions to the computer in order to achieve a given function.

(2) One or more of the constituent elements included in the acoustic reproduction device and the acoustic reproduction method described above may be configured from a single system large-scale integration (LSI) circuit. A system LSI circuit is a super-multifunction LSI circuit manufactured with a plurality of components integrated on a single chip, and is specifically a computer system including a microprocessor, a ROM, and a RAM, for example. A computer program is stored in the RAM. The system LSI achieves its function as a result of the microprocessor operating according to the computer program.

(3) One or more of the constituent elements included in the acoustic reproduction device described above may be configured as an integrated circuit (IC) card that is detachably attached to each device, or as a stand-alone module. The IC card and the module are computer systems including a microprocessor, a ROM, and a RAM, for example. The IC card and the module may include the super-multifunction LSI circuit described above. The IC card and the module achieve their function as a result of the microprocessor operating according to a computer program. The IC card and the module may be tamperproof.

(4) Further, one or more of the constituent elements included in the acoustic reproduction device described above may also be implemented as a computer-readable recording medium, such as a flexible disk, a hard disk, a CD-ROM, a magneto-optical (MO) disc, a digital versatile disc (DVD), a DVD-ROM, a DVD-RAM, a Blu-ray™ Disc (BD), or semiconductor memory, etc, having recording thereon the computer program or the digital signal. In addition, one or more of the constituent elements included in the acoustic reproduction device described above may also be implemented as the digital signal recorded on these recording media.

Moreover, one or more of the constituent elements included in the acoustic reproduction device described above may also be implemented by transmitting the computer program or the digital signal via, for example, an electric communication line, a wireless or wired communication line, a network such as the Internet, or data broadcasting.

(5) The present disclosure may be implemented as the methods described above. The present disclosure may be a computer program implementing these methods using a computer, or a digital signal including the computer program.

(6) Moreover, the present disclosure may be implemented as a computer system including (i) memory having the computer program stored therein, and (ii) a microprocessor that operates according to the computer program.

(7) Moreover, the program or the digital signal may be implemented by an independent computer system by being recorded on the recording medium and transmitted, or by being transmitted via the network, for example.

(8) The above embodiments and variations may be combined.

Although not illustrated in FIG. 2 or the like, a video that is linked to sounds output from headphones 200 may be presented to listener L. In this case, for example, a display device such as a liquid crystal panel and an organic electro luminescence (EL) panel may be provided on the periphery of listener L. The video is presented on the display device. Alternatively, the video may be presented on a head-mounted display or the like worn by listener L.

INDUSTRIAL APPLICABILITY

The present disclosure can be used for acoustic reproduction methods and acoustic reproduction devices, and is particularly applicable to stereophonic reproduction systems, for example.

The invention claimed is:

1. An acoustic reproduction method comprising:

obtaining information indicating a plurality of sounds and direction information indicating a direction in which a head of a listener is oriented, the plurality of sounds reaching the listener in a sound reproduction space;

judging whether a first direction in which a first sound reaches the listener and a second direction in which a second sound reaches the listener are in plane symmetry with respect to a predetermined plane, the first sound and the second sound being included in the plurality of sounds indicated in the information obtained, the predetermined plane passing through both ears of the listener and being perpendicular to the direction in which the head of the listener is oriented;

performing processing on sound information indicating the second sound when the first direction and the second direction are judged to be in plane symmetry, the processing being change processing of changing the second direction; and outputting the sound information subjected to the change processing.

2. The acoustic reproduction method according to claim 1, wherein the change processing is changing the second direction in order for the first direction and the second direction not to be in plane symmetry.

3. The acoustic reproduction method according to claim 1, wherein the second sound is an object sound different from the first sound, the acoustic reproduction method comprises:

extracting information, the extracting of the information including: obtaining audio content information; and extracting first region information, second region information, and the sound information that are included in the audio content information obtained, the first region information indicating a first region in which a sound image of the first sound is localized, the second region information indicating a second region in which a sound image of the second sound is localized, in the obtaining of the information and the direction information, the first region information extracted is obtained, in the judging, the second region information extracted is obtained, and in the performing of the processing, the sound information extracted is obtained.

4. The acoustic reproduction method according to claim 3, wherein the obtaining of the information and the direction information includes obtaining spatial information indicating a shape of the sound reproduction space, the acoustic reproduction method comprises:

determining, based on the first region information obtained and the spatial information obtained, the second region in which the sound image of the second sound is localized, the second sound being a reflected sound of the first sound, in the judging, the second region information indicating the second region determined is obtained, and in the performing of the processing, sound information indicating the first sound is obtained as the sound information indicating the second sound.

5. The acoustic reproduction method according to claim 2, wherein in the performing of the processing, the change processing of shifting the second direction to increase at least one of an interaural level difference of the second sound or an interaural time difference of the second sound is performed.

6. A non-transitory computer-readable recording medium having recorded thereon a program for causing a computer to execute the acoustic reproduction method according to claim 1.

7. An acoustic reproduction device comprising:

an obtainer that obtains information indicating a plurality of sounds and direction information indicating a direction in which a head of a listener is oriented, the plurality of sounds reaching the listener in a sound reproduction space;

a judging unit that judges whether a first direction in which a first sound reaches the listener and a second direction in which a second sound reaches the listener are in plane symmetry with respect to a predetermined plane, the first sound and the second sound being included in the plurality of sounds indicated in the information obtained, the predetermined plane passing through both ears of the listener and being perpendicular to the direction in which the head of the listener is oriented;

a processor that performs processing on sound information indicating the second sound when the first direction and the second direction are judged to be in plane symmetry, the processing being change processing of changing the second direction; and an outputter that outputs the sound information subjected to the change processing.

* * * * *